Figure 5:
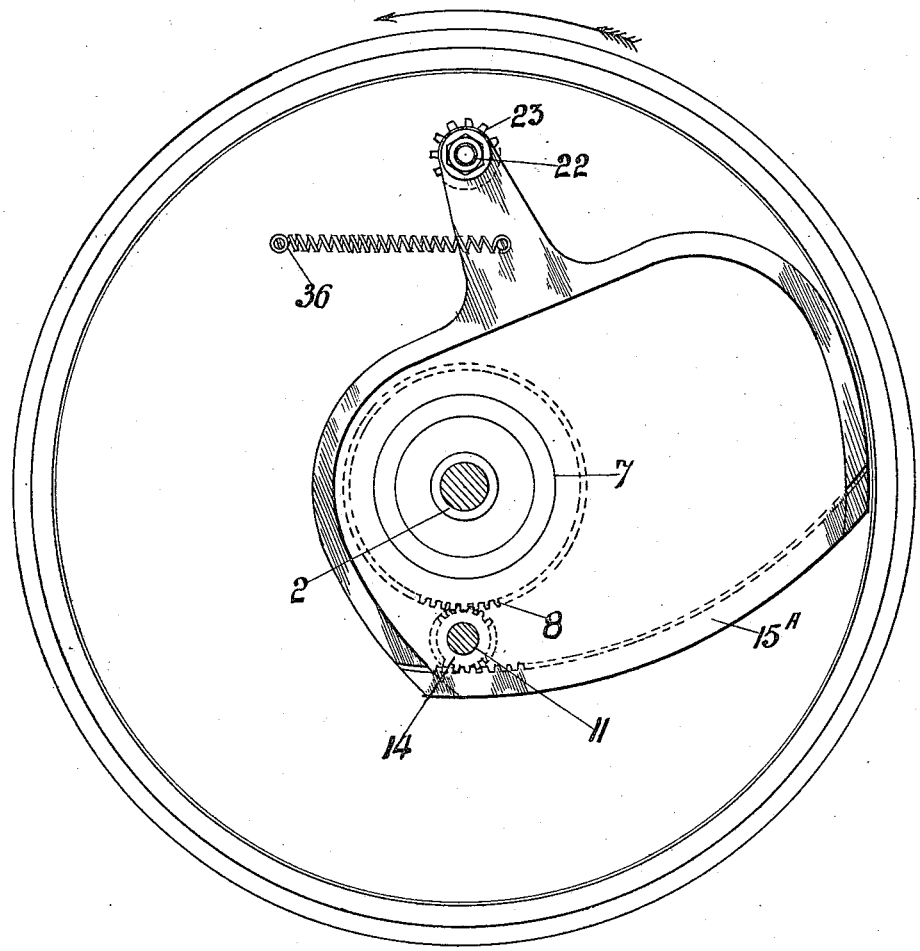

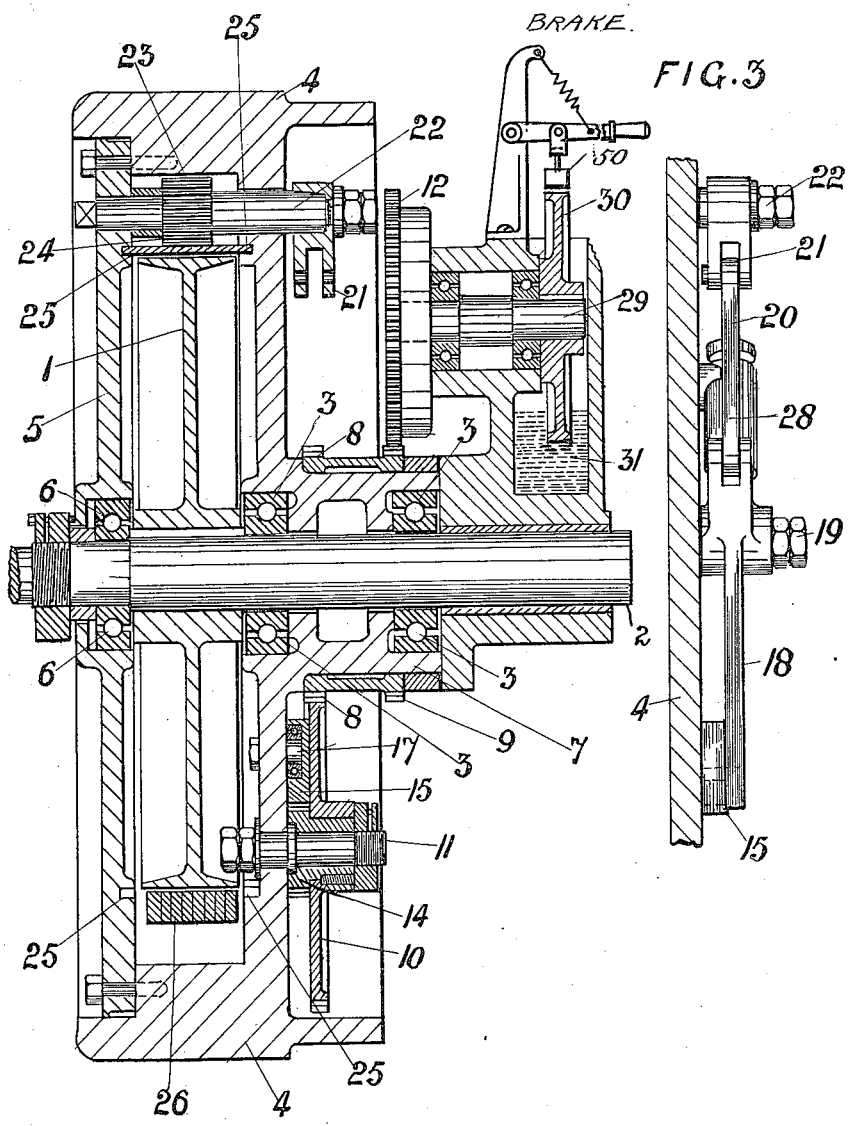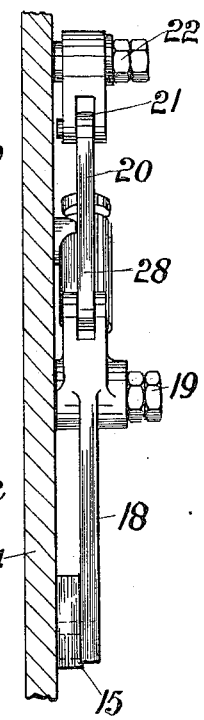

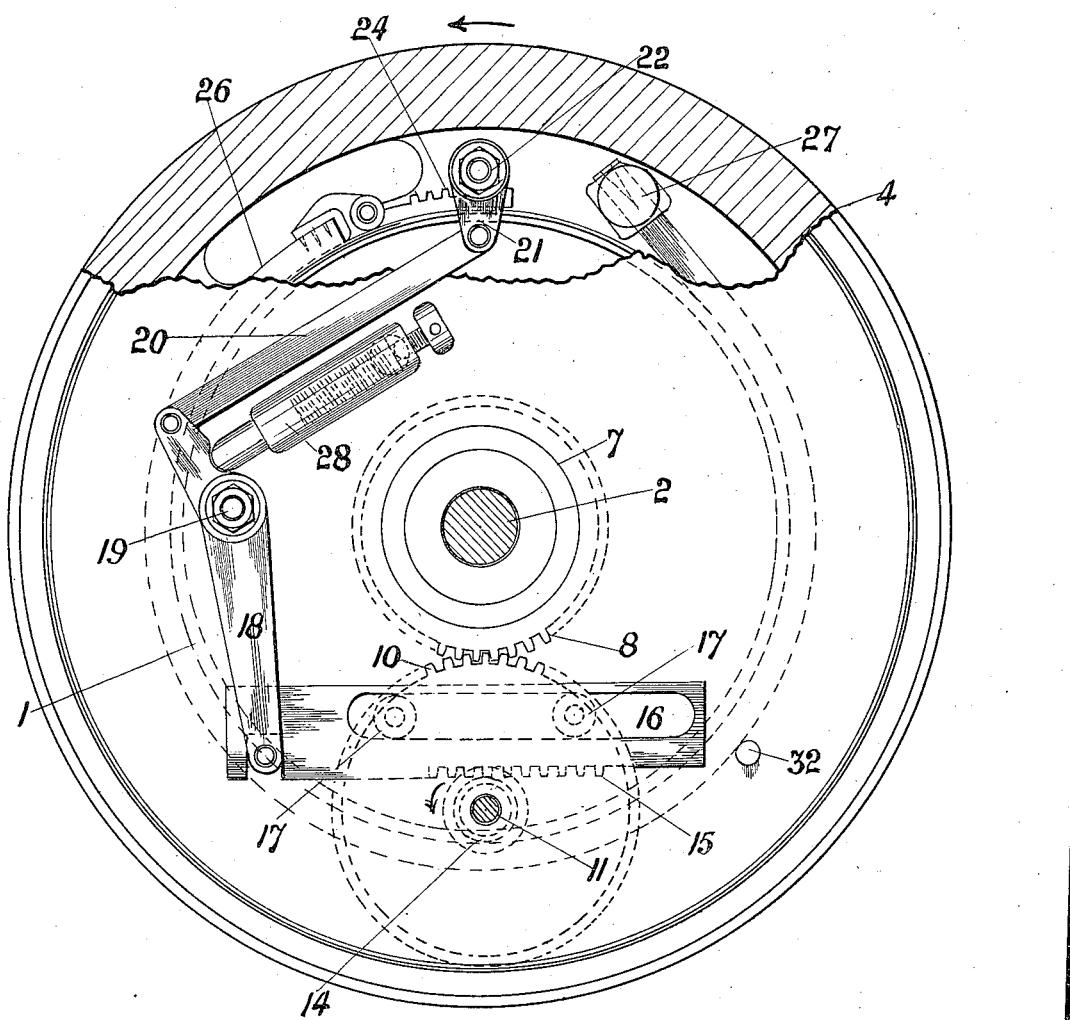

R. W. & L. H. BATEMAN.
CLUTCH MECHANISM.
APPLICATION FILED DEC. 27, 1910.
1,032,179.
Patented July 9, 1912.
5 SHEETS—SHEET 3.
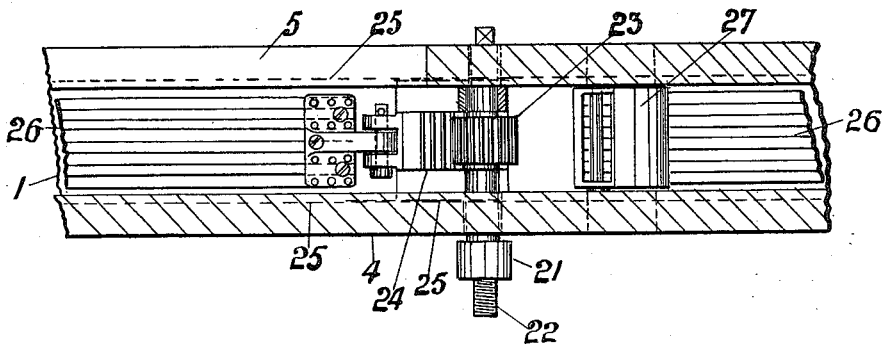
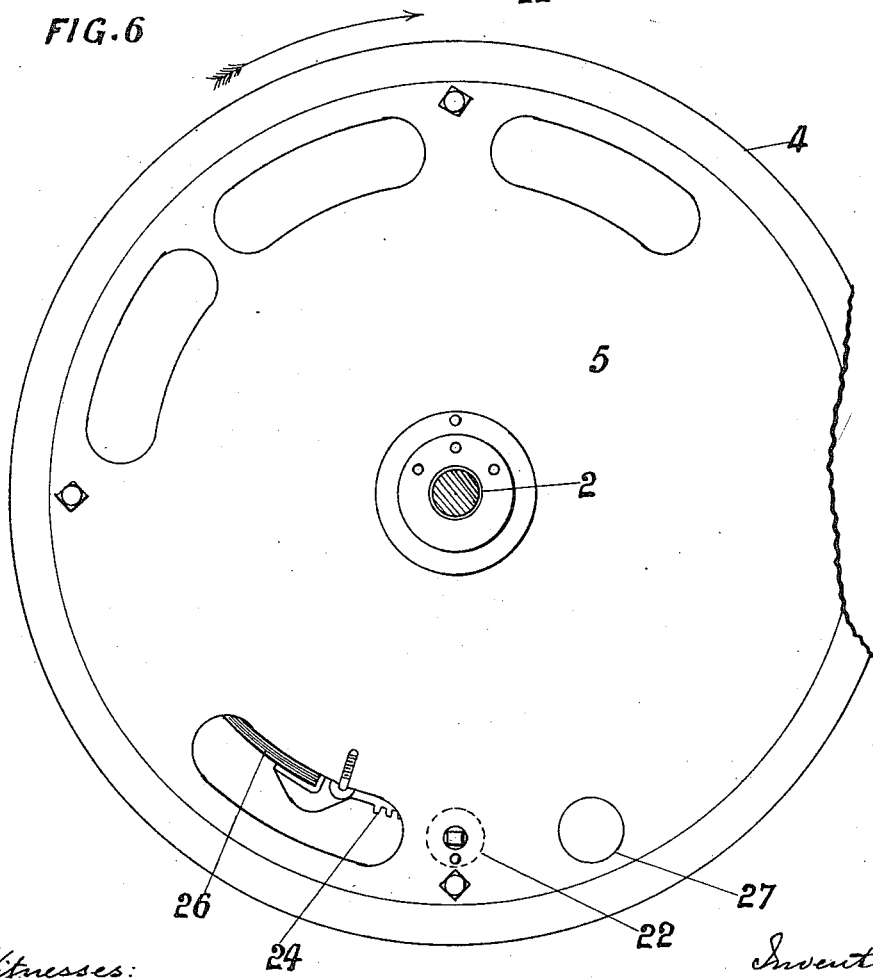

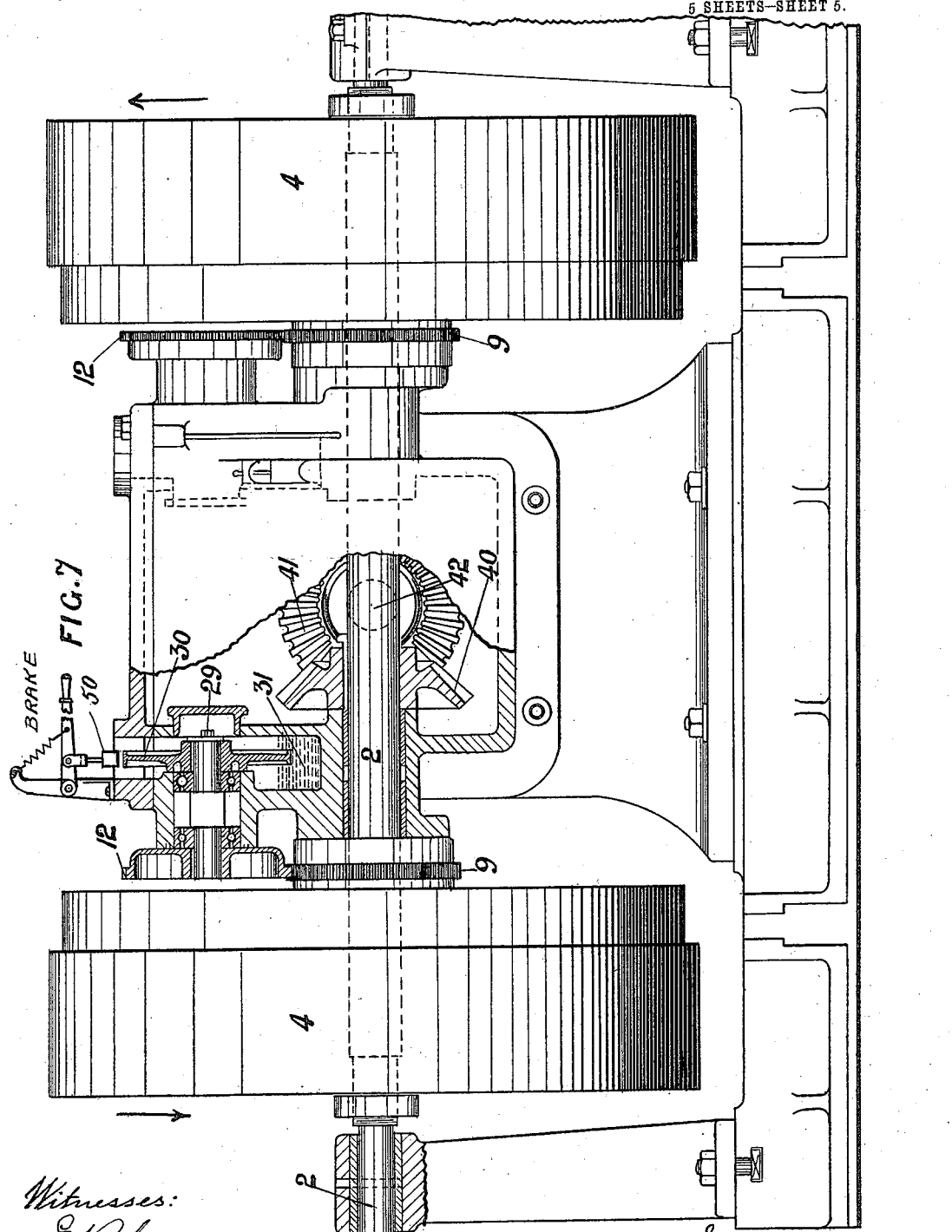

UNITED STATES PATENT OFFICE.

RICHARD WILKINSON BATEMAN AND LOFTUS HANSON BATEMAN, OF LEEDS, ENGLAND.

CLUTCH MECHANISM.

1,032,179.  Specification of Letters Patent.  Patented July 9, 1912.

Application filed December 27, 1910. Serial No. 599,344.

*To all whom it may concern:*

Be it known that we, RICHARD WILKINSON BATEMAN, of 35 Hill Crest avenue, Leeds, in the county of York, England, and LOFTUS HANSON BATEMAN, of 4 Kearsley Place, Hunslet Carr, Leeds, in the county of York, England, have invented certain new and useful Improvements in Clutch Mechanism, of which the following is a specification.

This invention relates to clutch mechanism gear and particularly to the class of mechanism employed upon planing, shaping and slotting machines for reciprocating the work carrying table, its object being to provide improved means for effecting the driving and reversal of the said table, which shall be very efficient and reliable in action and will insure the said table running at a maximum speed throughout its traverse without the necessity for any preliminary speeding up period, as at present usual before the cutting operation commences, and without setting up excessive stresses or strains in the working parts which would result in rapid deterioration or wear of same.

Our invention comprises the improved combination and arrangement of parts hereinafter described and claimed.

Referring to the accompanying sheets of explanatory drawings: Figure 1 is a sectional end elevation of the improved mechanism, a portion, illustrated by Fig. 3, being detached in order to more clearly illustrate the construction. Fig. 2 is a front elevation partly in section of the improved mechanism. Fig. 3 is a view in elevation of the portion of the mechanism which is detached from Fig. 1. Fig. 4 is a plan view of the portion of the steel or leather band encircling the driving pulley. Fig. 5 is a front elevation of a modified form of mechanism in which a pendulous or oscillating rack is substituted for the reciprocating rack. Fig. 6 is a front elevation of one of the face plates of the mechanism. Fig. 7 is an end elevation, partly in section, of the complete driving and reversing mechanism comprising duplicate pulleys, fly wheels and connections.

The improved mechanism comprises pulleys 1 1 keyed on the shaft 2. Concentric with each of the said pulleys 1 and loosely mounted on the shaft 2, and preferably on ball bearings 3 3 thereon, is a heavy fly wheel 4 continuously driven by means of a driving belt or strap. One fly wheel is driven by an open belt, and one by a crossed belt. Each fly wheel 4 is provided with a face plate or cover 5 which revolves with the wheel 4 on the ball bearings 6, the fast pulley 1 being thus entirely inclosed by the heavy fly wheel 4 and its face plate 5.

Loose on the extended boss 7 of the heavy fly wheel 4 is a double wheel 8 9, or a wheel with two rows of teeth, the row of teeth 8 meshing with a wheel 10 keyed on the bush 11 in the face of the heavy fly wheel 4. The other row of teeth 9 mesh with a wheel 12, on the shaft or spindle 29 on which is a retarding or brake wheel 30 working in a bath 31 containing soap and water, thin oil or other cooling medium.

The pinion 14 meshes with a rack 15 on two studs or antifriction bowls 17 17 fixed in the face of the heavy fly wheel 4, and one end of the rack 15 is connected to a rocking lever 18 pivoted on the stud 19 in the face of the wheel 4. The opposite end of the rocking lever 18 is by the link 20 connected to the crank 21 fixed on the spindle 22 mounted in the face of the fly wheel 4 and face plate or cover 5 jointly, and on the spindle 22 and directly adjacent to the pulley 1 is a toothed wheel or pinion 23 meshing with a segmental rack 24 carried in slots or recesses 25 25 in the wheel 4 and its plate or cover 5, (see Figs. 1 and 4.)

Fixed to one end of the segmental rack 24 is a band 26 of steel or leather which encircles the driving pulley 1, the other end being secured to a fixed point 27 in the fly wheel 4 or its cover plate 5, or both jointly. The width of the band 26 is slightly less than the width of the pulley 1, but if the latter is an extra wide one it is preferable to employ two or more belts or bands 26. On the shaft 2 is a beveled wheel 40 meshing with the wheel 41 on the shaft 42 which is the shaft to be driven and reversed.

An adjustable spring-pressed plunger 28 is applied to the rocking lever 18, or to the rack 15, to return the latter to its normal position, the movement of the rack 15 being limited by the stop 16 and the bowls or studs 17 17, or by the stop piece 32.

The operation of the mechanism is as follows: Assuming that the fly wheel 4 at the left hand side of Fig. 7 is acting to rotate the shaft 2 and through it the beveled wheels 40 and 41 which reciprocate the table of the planing, shaping, slotting or like machine, the other fly wheel 4 at the right hand side of the machine is then rotating idly upon the shaft 2 but in a reverse direction to said shaft and the fly wheel by which it is rotated.

In order to reverse the direction of the motion of shaft 2, a brake 50 is applied to the wheel 30 at one side of the machine, a corresponding brake on the other side of the machine being released. This brake is applied by hand, by pressing a block of wood against the wheel 30, or the brake may be applied automatically by a governor or controlling devices operated from the machine to which the reversing mechanism is applied. The result of removing said brake is to allow the spring-pressed plunger 28 (Fig. 2) to actuate the rocking lever 18 and return the rack 15 to its inoperative position against the stop 32. Such movement causes a backward rotation of the wheels 14, 10, 8, 9, 12 and 30. In the other case in which the brake is brought into operation, a reverse action takes place, that is, the motion of the wheel 30 is retarded and also that of the wheels 12, 8 and 9. The wheel 10, however, which revolves around the axis of the shaft 2, being carried by the fly wheel 4, is now caused to rotate about its own axis due to the resistance of the wheel 8 to free rotation. Such rotation of the wheel 10 results in the rotation of the wheel 14, and a movement of the rack 15, rocking lever 18, link 20, crank 21 and pinion 23. The latter meshing in the rack 24 upon the band or strap 26, draws the band or strap tightly around the pulley 1 so as to establish a direct and positive drive between the fly wheel 4 and the pulley.

With the arrangement aforesaid we provide that the fly wheels act not only to drive the pulleys by which the machine table is actuated but also to bring the bands or straps 26 into action when the wheels 30 are retarded. The employment of bands 26 which encircle the peripheral edge of the part to be driven, obviates the necessity for metallic supporting members such as are usually fitted in the driving mechanism of planing machines, and which are necessary when the band is arranged to operate upon the internal periphery of the driven element. We thus insure that the said band shall not be brought into such hard or firm contact with the pulley 1 at the instant of reversal as will cause shock and rapid wear of the said band and also set up destructive stressses in the machine, but shall at first yield or act as a brake before finally establishing a positive drive with its pulley. We thus insure a rapid and smooth stoppage and reversal of the planing or like table. The employment of the fly wheels 4 provides for such a reserve of energy at the instant of reversal as will immediately overcome the inertia of the part being reversed without placing undue strain upon and causing excessive wear of the driving belts, ropes or their equivalents.

Instead of the rack 15 being straight and reciprocating, it may be in the form of an arc as shown at 15$^A$ in Fig. 5, and fixed on the spindle 22 and capable of a pendulous or oscillatory movement therewith when the double wheel 8 9 mounted on the extended boss 7 is retarded, and the wheel 14 which meshes with the arc-shaped rack 15$^A$ is rotated in the manner before described.

What we claim is:

1. The combination, with a wheel continuously rotated in one direction, a pulley, a band for providing an operative connection between the said wheel and pulley, and a retarding device, of means under the controlling action of said retarding device for causing said wheel to bring the band into its operative position, as set forth.

2. The combination, with a flywheel continuously rotated in one direction, a pulley concentric with said flywheel, a band secured at one end to said flywheel and surrounding said pulley, and a retarding device, of means under the controlling action of said retarding device for causing said flywheel to bring the band into its operative position and for returning said band to its inoperative position, as set forth.

3. The combination, with a shaft, a flywheel continuously rotated in one direction mounted loosely upon said shaft, a pulley concentric with said flywheel and keyed on said shaft, a band secured at one end to said flywheel and surrounding the peripheral edge of said pulley, a rack secured to the other end of the band, a pinion carried by the flywheel and gearing with said rack, and controlling means for regulating the action of said band, comprising means causing said flywheel to revolve the said pinion and thereby actuate said band in one direction, and means for returning the band to its inoperative position, as set forth.

4. The combination, with a flywheel continuously rotated in one direction, a pulley concentric with said flywheel, a band for providing an operative connection between said flywheel and pulley, a rack upon said band, and an epicyclic train of wheels in operative connection with said rack, of a retarding device acting upon one of said train of wheels and controlling the actuation of said rack, as set forth.

5. In combination, a shaft, a pulley keyed upon said shaft, a flywheel free upon said shaft and continuously driven in one direction, a band surrounding said pulley and having one end secured to the flywheel, a rack secured to the other end of the said band, a pinion carried by each flywheel and gearing with said rack, a brake wheel, an epicyclic train of wheels between the brake wheel and pinion, means retarding said brake wheel and placing the flywheel into driving connection with the pulley, and means destroying said driving connection upon the release of said brake, as set forth.

6. In combination, a shaft, a pulley secured upon said shaft, a flywheel continuously driven in one direction, a face plate secured to the flywheel, a band attached to said flywheel and surrounding said pulley, the flywheel and face plate forming a chamber inclosing the pulley and driving band, means for actuating said band to place the flywheel into driving connection with the pulley and further means for moving said band to its inoperative position, as set forth.

7. The combination, with a driven shaft, a driving wheel, and a face-plate secured to the said wheel, said wheel and face-plate forming a chamber and each having a hub which is journaled on the said shaft; of a driven pulley arranged in the said chamber and secured on the driving shaft between the two hubs, a flexible clutch band for engaging with the said pulley, said band being also inclosed in the said chamber and having a toothed rack at one end and having its other end secured to the driving wheel, a rock-shaft carried by the driving wheel and provided with a toothed pinion which engages with the said rack and having one end portion projecting from the said chamber, a crank secured on the projecting end portion of the rock-shaft, and means for operating the said crank while the driving wheel is in motion.

8. The combination, with a shaft, and a driving wheel mounted thereon; of a pulley secured on the said shaft, a friction clutch band carried by the said driving wheel and engaging with the said pulley and provided with an operating crank, a toothed pinion carried by the driving wheel on an axis eccentric of the said shaft, a slidable toothed rack carried by the driving wheel and gearing into the said pinion, intermediate driving connections between the said pinion and crank, and means for revolving the said pinion on its own axis while the driving wheel is in motion.

9. The combination, with a shaft, and a driving wheel mounted thereon; of a pulley secured on the shaft adjacent to the driving wheel, a friction clutch band carried by the said driving wheel and adapted to engage with the said pulley and provided with a crank for operating it, a toothed wheel carried by the said driving wheel on an axis eccentric of the said shaft, a toothed pinion secured to the said toothed wheel, a toothed rack carried by the said driving wheel and gearing into the said pinion, a spring-controlled lever pivoted to the said driving wheel and having its opposite end portions operatively connected with the said rack and crank respectively, a toothed wheel mounted concentric with the said driving wheel and gearing into the said toothed wheel and means for actuating the last said toothed wheel.

In testimony whereof we affix our signatures, in presence of two witnesses.

RICHARD WILKINSON BATEMAN.
LOFTUS HANSON BATEMAN.

Witnesses:
ERNEST O. MARSHALL,
H. P. CARRINGTON.

---

Copies of this patent may be obtained for five cents each, by addressing the "Commissioner of Patents, Washington, D. C."